May 5, 1970 F. J. SCHAUF 3,509,888
SMOKING PIPE CARTRIDGE
Original Filed June 15, 1964 2 Sheets-Sheet 1
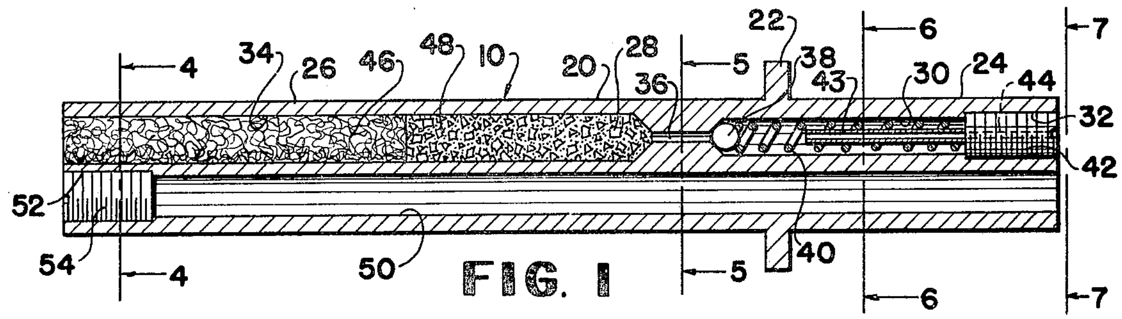
FIG. 1
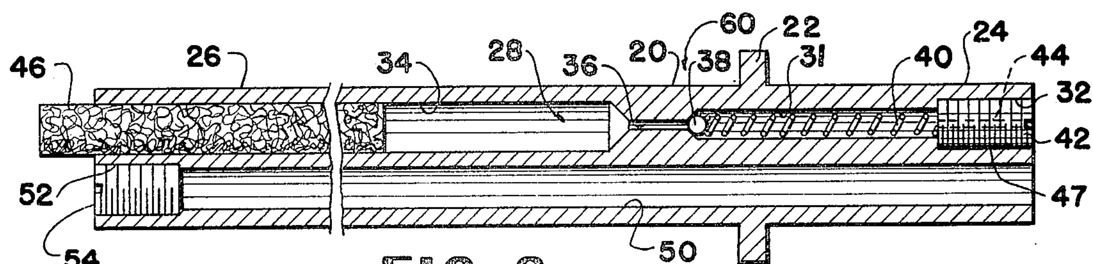
FIG. 2
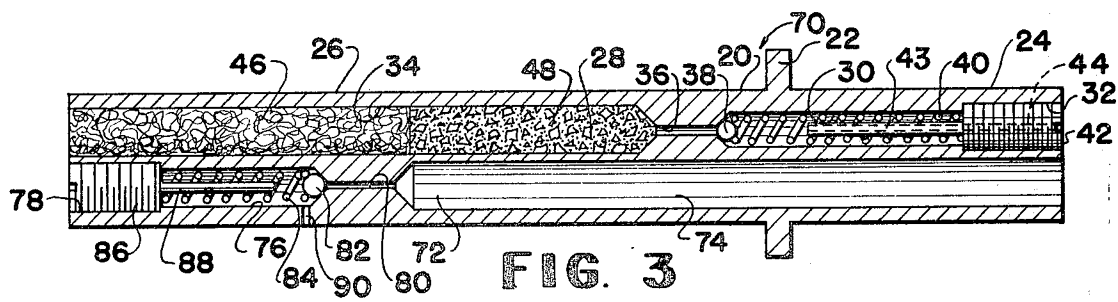
FIG. 3
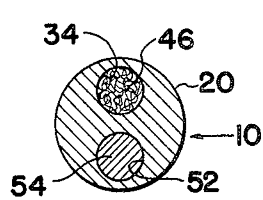
FIG. 4
FIG. 5
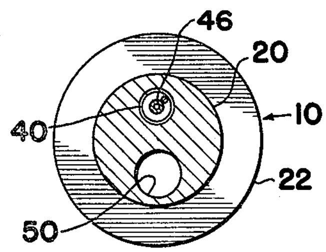
FIG. 6
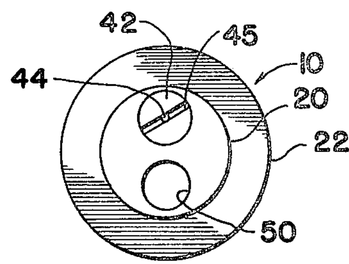
FIG. 7
INVENTOR.
FRANCIS J. SCHAUF
BY John H. Widdowson
ATTORNEY

SMOKING PIPE CARTRIDGE

Original Filed June 15, 1964 2 Sheets-Sheet 2

INVENTOR.
FRANCIS J. SCHAUF
BY John H. Widdowson
ATTORNEY

United States Patent Office 3,509,888
Patented May 5, 1970

1

3,509,888
SMOKING PIPE CARTRIDGE
Francis J. Schauf, 111 S. Nevada, Wichita, Kans. 67209

Substituted for abandoned application Ser. No. 375,227, June 15, 1964. This application May 27, 1968, Ser. No. 733,227
Int. Cl. A24f *13/04, 1/02*
U.S. Cl. 131—207 4 Claims

ABSTRACT OF THE DISCLOSURE

A filter cartridge, which fits betwen the stem on the bowl and the mouthpiece of a common pipe, has an elongated body with a flange which abuts the stem on the bowl and mouthpiece. The cartridge has two longitudinally extending apertures therethrough. One communicates with the bore in the pipe bowl stem and that in the mouthpiece. It has two end portion bores connected by a smaller bore. The outer end portion bore has a normally closed check valve therein, which opens upon drawing on the pipe. The inner end portion bore contains a fibrous filtering plug. The other longitudinally extending aperture in the cartridge body is plugged in its inner end and communicates with the bore in the mouthpiece. The latter bore is adapted to trap moisture and prevent same from entering the pipe bowl.

This application is a substitute of abandoned application Ser. No. 375,227, filed June 15, 1964.

Many efforts have been made by pipe designers and manufacturers to minimize the accumulation of moisture in pipes and to prevent that moisture which has built up from being drawn into the smoker's mouth. These efforts have in general resulted in complicated structural arrangements in the pipe and stem thereof which were intended to direct the moisture into traps or depressed sections and thereby prevent same from reaching the bowl of the pipe. The resultant structure devised for this purpose was quite complex and necessitated the building in of the necessary features into the pipe. This, of course, increased the cost of the pipe considerably. These pipes in general were quite difficult to clean.

A serious disadvantage with the structures known to the prior art for trapping moisture was that they could not be readily embodied into a conventional pipe. Due to the complex nature of the structure, it had to be built into the pipe, which often made the cost prohibitive.

The cartridge means of my invention has a first aperture having a check valve therein providing a passage for smoke, and a moisture trap to receive moisture and prevent it from reaching the bowl. Specific embodiments of my invention also provide a means for adding flavor to the smoke.

The cartridge means in the pipe of my invention solves many of the problems associated with analogous devices known to the prior art. This eliminates the necessary complex costly pipe structure known to the prior art. My cartridge means can be used on either a conventional pipe by merely counterboring the longitudinal passages in the stem and mouthpiece or it can be used in a pipe specifically designed to receive it. The cartridge means can be either conveniently disassembled and cleaned or in alternative can be discarded when tars and residue, etc. become accumulated therein. This makes smoking more enjoyable and may remove ingredients from the smoke which are believed to be harmful to health.

An object of my invention is to provide a new element for a pipe.

Still another object of this invention is to provide a new cartridge means that will effectively prevent moisture from reaching the bowl of the pipe through the mouthpiece.

2

Another object of this invention is to provide a cartridge means that is small and sufficiently slim to be positioned in the pipe stem of a conventional pipe.

Another object of this invention is to provide an efficient means for preventing moisture from reaching the bowl of the pipe that does not necessitate complete pipe structures.

Still another object of this invention is to provide a new pipe cartridge that is easy and simple to clean.

Yet another object of this invention is to provide a cartridge for a pipe that can be utilized in a conventional pipe with the minimum of modification.

Still another object of this invention is to provide a cartridge means that adds a flavor to the smoke drawn through the pipe stem.

Another object of this invention is to provide a cartridge means that will prevent both accumulation of moisture in the bowl of the pipe and also make possible the addition of a flavor to the smoke being drawn through the stem.

Drawings accompany and are a part of this disclosure. These drawings depict preferred specific embodiments of the new cartridge and combination thereof of my invention, and it is to be understood that such drawings are not to unduly limit the scope of my invention. In the drawings, FIG. 1 is a longitudinal cross sectional view of a preferred specific embodiment of my invention.

FIG. 2 is a longitudinal cross sectional view of still another preferred specific embodiment of my invention.

FIG. 3 is a longitudinal cross sectional view of still another specific embodiment of my invention.

FIG. 4 is a transverse cross sectional view taken on line 4—4 of FIG. 1.

FIG. 5 is a cross sectional view taken on line 5—5 of FIG. 1.

FIG. 6 is a cross sectional view taken on line 6—6 of FIG. 1.

FIG. 7 is an end view of FIG. 1.

Figure 8:
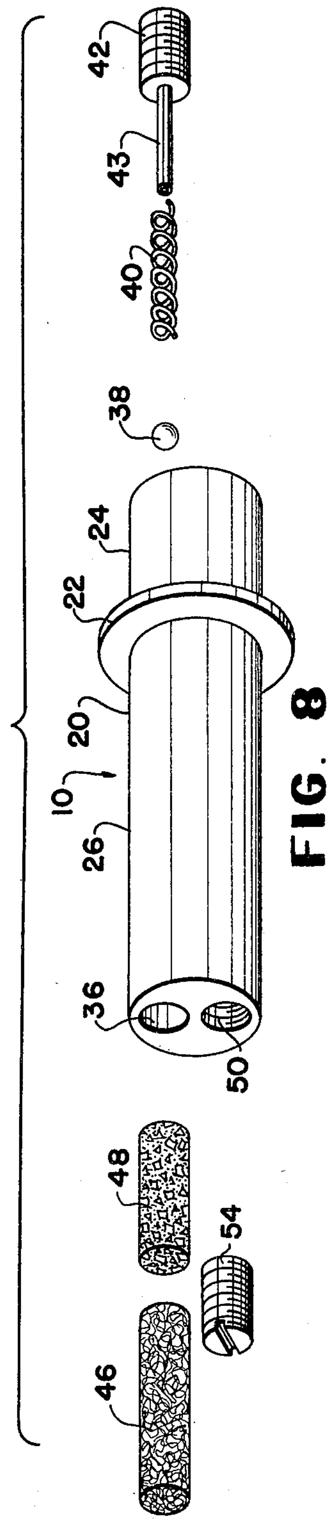
FIG. 8 is a perspective view in exploded relation of the embodiment of my invention depicted in FIG. 1.

The following is a discussion and description of the new pipe cartridge and combinations thereof of my invention made with reference to the drawings wherein the same reference numerals are used to indicate the same or similar parts and/or structure. The discussion and description is of preferred specific embodiments of the new pipe cartridge structure and combinations thereof of my invention, and it is to be understood that such is not to unduly limit the scope of my invention.

Figure 9:
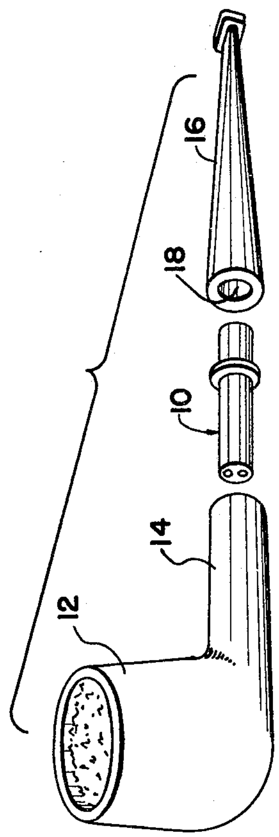
FIG. 9 is a perspective view in exploded relation showing the pipe and cartridge combination of my invention.

Referring now to the drawings, FIGS. 1–9, there is depicted a first preferred specific embodiment of the cartridge means 10 of my invention in FIGS. 1 and 4–7. Cartridge 10 of my invention is particularly adapted to be inserted, as shown in FIG. 9, in a common and usual tobacco pipe having a bowl 12 with an integral stem 14 attached thereto, and a mouthpiece 16. The stem has the usual longitudinal bore therein communication with the bowl 12, like the bore shown in mouthpiece 16. The longitudinal bore in stem 14 has a counterbore adjacent the end thereof. The mouthpiece 16 has a longitudinal bore and a counterbore 18 adjacent the end thereof. The cartridge means 10 shown in detail in FIG. 1 has an elongated cylindrically shaped body 20 with a generally centrally positioned radially extending flange 22 separating same into a first end portion 24, that is insertable in counterbore 18 in the mouthpiece 16, and a second end portion 26 that is insertable in the counterbore in stem 14.

A first longitudinally extending aperture 28 is provided in the body which is offset from the longitudinal axis of same. The aperture 28 provides a passage for smoke. Aperture 28 has a first enlarged diameter bore portion 30 in end portion 24, which is provided with thread means 32 on the end thereof. Aperture 28 includes a second enlarged diameter bore portion 34 which extends from the upstream end of the cartridge 20 to the upstream end of a third relatively small diameter bore portion 36 which connects the bore portions 30 and 34. A check valve is provided in the enlarged bore portion 30, which consists of a spherical ball 38 in seating engagement with the downstream end of the bore portion 36. A relatively soft coil spring 40 engages ball 38 which is held in place by a plug means 42 that is threadedly engaged in threads 32. The plug means 42 has a central aperture 44 connected to a relatively small tube 43. The tube 43 maintains spring 40 in centered relationship in enlarged bore 30. Plug 42 is also provided with a slot 45, adapted to receive a screw driver blade, to enable same to be disassembled. A cylindrically shaped filter plug 46 is positioned in the bore portion 34. The plug 46 can be made of any suitable type of filter material. I have found that a cotton plug works very well as a filter. Suitable smoke flavoring crystals 48, or the like, are positioned in enlarged bore portion 34, and held in place by plug 46. The crystals 48 can be of any suitable type to add flavor to the smoke being drawn through aperture 28. However, I have found that menthol crystals give a very pleasant flavor to the smoke and are preferred for this purpose.

A second relatively large longitudinally extending aperture 50 is provided in body 20. The aperture 50 is preferably spaced from the longitudinal axis of body 20. Thread means 52 are provided in the end portion 26 of body 20, as illustrated in FIG. 1. A plug 54 is threadedly engaged in the aperture 50 in thread means 52. Plug 54 is provided with a transverse slot to enable same to be removed. The body 20 of cartridge 10 can be made of any suitable type of material. Suitable materials for the cartridge 10 of my invention are plastics, ceramics, metals, etc. I have found that aluminum is very desirable for this purpose.

In use, the cartridge means 10, in combination with a pipe, is adapted to trap the moisture in the mouthpiece of the pipe and prevent same from reaching the bowl. The moisture, if allowed to reach the bowl, will mix with the contents of the bowl. During smoking the moisture may then be drawn into the smoker's mouth and cause a bitter unpleasant taste. My cartridge prevents this. The cartridge of my invention also provides a suitable cavity in the aperture for adding menthol or flavor to the tobacco smoke. In use the menthol crystals are placed in the enlarged bore portion 26. The bore portions 50 and 74, FIGS. 1 and 2, and FIG. 3, respectively, are saliva traps, and that material that may be condensed from the smoke stream in use is trapped in one of the filters.

The cartridge 60 depicted in FIG. 2 of the drawings is another specific embodiment of the invention and is very similar to the embodiment in FIG. 1, except that the enlarged bore portion 31 of aperture 28 is somewhat reduced in size, and the plug 42 is received in a threaded counterbore 47. FIG. 2 also illustrates that the cartridge means of my invention can be used with or without flavoring means in the bore portion 34.

In FIG. 3 is depicted cartridge 70, another specific embodiment of my invention. The cartridge 70 has an elongated cylindrically shaped body 20, a radially extending flange 22 on body 20 which separates the body into a first end portion 24 and a second end portion 26. Cartridge 70 is adapted to be inserted into the stem and mouthpiece of a pipe in generally the same manner as cartridges 10 and 60. A first longitudinally extending aperture 28 as provided in cartridge 70, which aperture 28 has a first enlarged diameter bore portion 30, a second enlarged bore portion 34, and a relatively small diameter bore portion 36 connecting bore portions 34 and 36. A check valve is provided in enlarged bore portion 30, which check valve has a ball 38, a coil spring 40, and a plug 42 having an aperture 44. The structure of the check valve corresponds to the check valve structure described in the embodiment shown in FIG. 1. A filter plug 46 is positioned in enlarged bore portion 34 which can in use hold flavoring crystals 48 in the bore portion.

A second longitudinally extending aperture 72 is provided in body 20 for trapping moisture and residue. The aperture 72 is spaced from the longitudinal axis of body 20. Aperture 72 has an enlarged diameter bore portion 74 in end portion 24, and a second enlarged bore portion 76 in the end portion 26 of body 20. A bore portion 76 extends from the end to a point spaced from the inner end of bore portion 74. Thread means 78 are provided in bore portion 76. A relatively small bore portion 80 connects enlarged bore portions 74 and 76. A check valve is provided in enlarged bore portion 76, which check valve has a ball 82 in seating engagement over bore portion 80. A relatively hard coil spring 84 contacts the ball 82. A plug 86 is threadedly engaged in threaded portion 78 and maintains the spring 84 and ball 82 in operative position. Plug 86 can be provided with a longitudinally extending stub portion 88 which maintains the spring 84 in proper alignment. A transversely extending aperture 90, positioned adjacent ball 82, communicates with enlarged bore portion 76 and the exterior of cartridge 70. Plug 86 is provided with a slot or other suitable means for facilitating its removal from the cartridge. In use the aperture 72 will receive moisture in the enlarged bore portion 74 and thereby prevent it from reaching the bowl of the pipe. The cartridge is positioned in the pipe stem and mouthpiece of the pipe so that aperture 72 is located beneath aperture 28. When it is desired to clear the moisture from aperture 72 the cartridge can be removed from the pipe stem and mouthpiece and air pressure applied on the first end 24. The air pressure will unseat ball 82 allowing the moisture to pass through bore portion 80 and out aperture 90. It can be seen that the cartridge 70 of my invention can be easily disassembled and cleaned if necessary.

I claim:

1. In a tobacco pipe having a bowl with an integral stem attached thereto, said stem having a longitudinal bore in communication with said bowl and having a counterbore, a mouthpiece having a longitudinal bore and having a counterbore, the improvement comprising, a separate and removable cartridge positioned between said stem and said mouthpiece, said cartridge having a body, a generally centrally positioned relatively narrow and radially extending flange on said body having an external form corresponding substantially to the external portions of the inner ends of said stem and mouthpiece and separating said cartridge into a first end portion insertable in the counterbore of said mouthpiece, and a second end portion insertable in the counterbore of said stem with said flange abutting said inner ends of said stem and mouthpiece, said body having a first longitudinally extending aperture communicating with said longitudinal bore in said stem and providing a passage for smoke, said body having a first bore portion in said first end portion, said body having a second bore portion in said second end portion extending from the end to a point spaced from the inner end of said first bore portion, and a third smaller diameter bore portion connecting said first and said second bore portions, a check valve in said first bore portion comprising, a valve element in seating engagement with said third bore portion, a resilient means in engagement with said valve element urging same into seated position, and a plug removably mounted in said first end portion of the said body and having an aperture therethrough providing communication between said first bore portion and said longitudinal bore in said mouthpiece, a fibrous plug in said second bore portion, said body having a second longitudinal extending aperture in said second end portion communicating with said longitudinal bore in said mouthpiece in the other end portion, and a plug for said second aperture removably mounted at said second end portion of said body, said cartridge when in use adapted to trap moisture in said second aperture and prevent same from reaching said bowl.

2. The cartridge means of claim 1 wherein there are menthol crystals in said second bore portions between said fibrous plug and said bore portion.

3. The cartridge means of claim 1 wherein said body has a first bore portion in said second longitudinally extending aperture in first end portion, and a second bore in said second longitudinally extending aperture in said second end portion, said second bore portion extending from the end to a point spaced from the inner end of said first bore portion, and a third smaller diameter bore portion connecting said first and second bore portions, a check valve in said second bore poriton of said second aperture, comprising, a valve element in seating engagement with one end of said third bore portion, a resilient means in engagement with said valve element urging same into seated position, and said plug for said second aperture maintaining said valve element in seating engagement, and means providing a transverse aperture in said body providing communication between the second bore portion of said second aperture and the exterior of said cartridge, whereby when in use, said cartridge is adapted to trap moisture in said second aperture and prevent same from reaching said bowl and discharge same through said transverse aperture upon blowing on said mouthpiece.

4. The cartridge means of claim 3, wherein said body has menthol crystals in said first longitudinal aperture in said second bore portion thereof between said fibrous plug and said third bore portion.

References Cited

UNITED STATES PATENTS

| | | | |
|---|---|---|---|
| 1,710,440 | 4/1929 | Torrese. | |
| 1,835,124 | 12/1931 | Torrese. | |
| 1,974,242 | 9/1934 | Jordan et al. | 131—200 |
| 2,081,378 | 5/1937 | Hogan | 131—201 |
| 2,305,190 | 12/1942 | Pasut | 131—215 |
| 2,850,021 | 9/1958 | Davis. | |

FOREIGN PATENTS

| | | |
|---|---|---|
| 1,495,169 | 8/1967 | France. |
| 18,860 | 1910 | Great Britain. |

JOSEPH S. REICH, Primary Examiner

U.S. Cl. X.R.

131—201, 215, 266